United States Patent [19]

Ford et al.

[11] 4,158,624
[45] Jun. 19, 1979

[54] APPARATUS FOR DEFLECTING BOTTLES IN BOTTLE FEEDING APPARATUS

[75] Inventors: Geoffrey E. Ford; Antis Pantelides; Trevor R. Willsmer, all of Bedford, England

[73] Assignee: TI Fords Limited, Bedford, England

[21] Appl. No.: 873,683

[22] Filed: Jan. 30, 1978

[30] Foreign Application Priority Data

Mar. 21, 1977 [GB] United Kingdom ............... 11874/77
Jul. 1, 1977 [GB] United Kingdom ............... 27738/77

[51] Int. Cl.² .............................................. B07C 5/00
[52] U.S. Cl. .................................... 209/523; 209/557; 209/565; 209/644; 209/656; 198/367; 198/442
[58] Field of Search ............... 209/557, 523, 524, 525, 209/526, 533, 527, 528, 529, 530, 531, 532, 644, 656; 198/367, 442

[56] References Cited

U.S. PATENT DOCUMENTS 3,409,128  11/1968  Hutaff .................................. 209/522
3,804,240  4/1974  Wahlert ................................ 209/644

Primary Examiner—Allen N. Knowles
Attorney, Agent, or Firm—Brisebois & Kruger

[57] ABSTRACT

The invention relates to bottle feeding apparatus in which bottles in an upright position are moved continuously in a stream along a path, means being provided for deflecting the mouth of a bottle transversely of the direction of its forward movement to tilt the axis of the bottle, the neck of a deflected bottle being engaged by a plough positioned adjacent to and downstream of the deflecting means and shaped progressively to displace the body of the bottle sideways out of the stream of moving bottles. As a deflected bottle is moved sideways out of the stream it is guided by the plough into a deflection channel and its axis is restored to an upright position by its neck engaging with a rail at the opposite side of the deflection channel and by the squeezing action of adjacent bottles.

6 Claims, 11 Drawing Figures

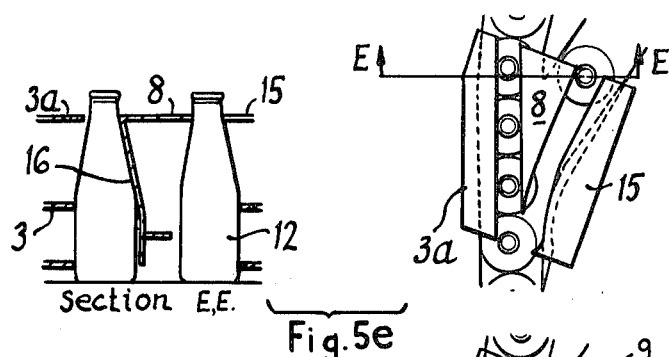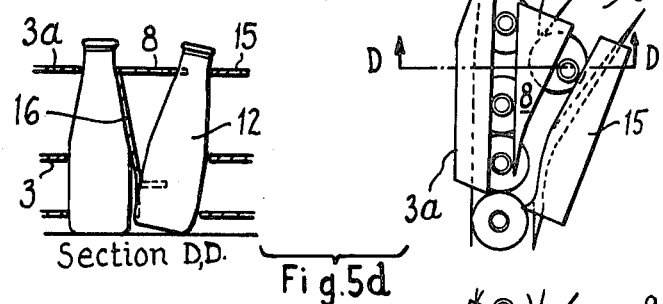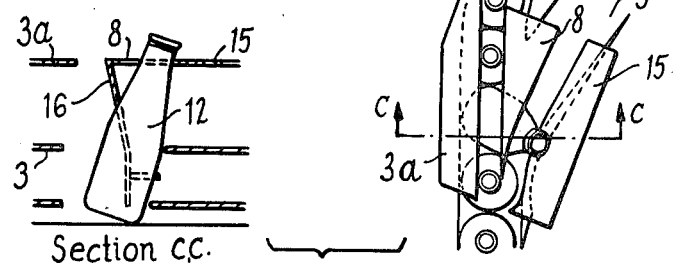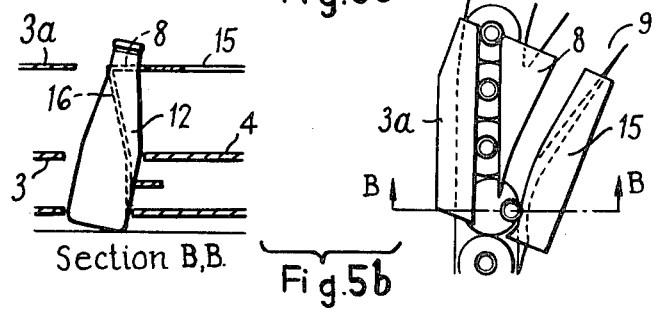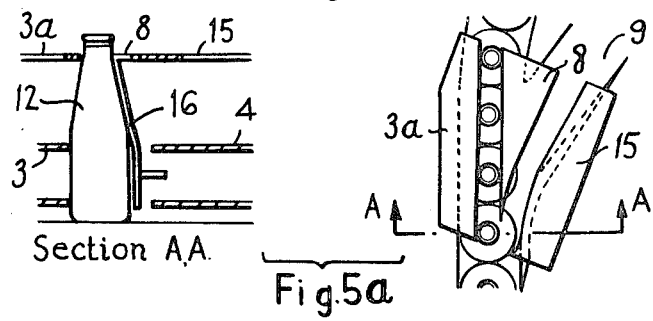

ABSTRACT

APPARATUS FOR DEFLECTING BOTTLES IN BOTTLE FEEDING APPARATUS

FIELD OF THE INVENTION

The invention relates to apparatus for deflecting bottles in bottle feeding apparatus, and more particularly, but not exclusively, to apparatus for deflecting from a stream of bottles passing an inspection station any bottle which is defective, dirty or for some other reason has to be rejected.

Automatic bottle inspection apparatus must be installed in the line leading to the bottle filling machine and to be satisfactory the inspection must be carried out at a rate not less than the rate at which the filler is capable of filling the bottles. In some cases it is necessary to install more than one inspection machine in the bottle filler line in order to meet the requirements of the filler machine. In some cases where the bottles are advanced through the inspection machine in spaced relation, for example by a star wheel as described in U.S. Pat. No. 3,411,009, a dirty bottle can be individually rejected before it is returned to the conveyor leading to the filling machine. Where the bottles move through the inspection machine in single file and touching one another, difficulty is experienced in rejecting a single dirty bottle and arrangements have been proposed which reject a group of bottles, including possibly clean bottles on opposite sides of the dirty bottle, to ensure that the dirty bottle is rejected. The rejected bottles are then visually inspected.

This has not proved satisfactory to the bottling industry. The specification of U.S. Pat. Nos. 3,746,165 and 3,727,068 describe bottle inspection machines in which dirty bottles are individually rejected. The bottles, moving in single file, pass an optical inspection unit and when a dirty bottle is detected a double-pronged claw is caused to move at high speed into the path of the bottles so that the flow is stopped and the dirty bottle is captured between the prongs of the claw. A pneumatic ram then gently ejects this bottle in a direction substantially at right angles to the normal flow of bottles. The ram and the claw both retract after the dirty bottle has been rejected thus allowing the bottles upstream to move once more.

This mechanism works satisfactorily at bottle speeds up to about 400/min but above this speed various problems arise. The claw must move very rapidly in order to capture the dirty bottle to be rejected. Any additional time delay due to low air pressure or extra friction will cause the claw to capture a subsequent bottle instead of the dirty bottle. Also, stopping the flow of bottles very rapidly generates a considerable impact shock in the bottles upstream which can cause breakage with lightweight bottles.

A further disadvantage is that the rejection of a bottle produces a gap in the otherwise continuous flow of bottles downstream. For example, a one second stop to reject a bottle causes a gap of seven bottle diameters or more to appear in the downstream bottle flow of 400/min. This gap may close before the filling machine is reached provided conveyor speeds are high enough and provided there is sufficient length of conveyor between the inspection machine and the filling machine. This limitation on the relative siting of the machines is not always acceptable.

SUMMARY OF THE INVENTION

The present invention has for an object to overcome or alleviate the disadvantages of prior rejection apparatus. The invention has enabled satisfactory rejection to be achieved with machines operating at bottle flows of over 800 per minute.

Bottles are commonly fed to a bottle filling machine by a slat band conveyor on which the bottles are standing. The rate of flow of the bottles is determined by the filler speed and the conveyor is usually adjusted to run at a slightly higher flow rate so that a continuous queue of bottles is presented to the filler input. There is, therefore, a compressive force between adjacent bottles. The inspection machine is sited in this continuous queue of bottles.

It has been found that in spite of the compressive force between bottles, it is relatively easy to deflect the mouth of a bottle in a direction at right angles to the line of motion provided that the side guides of the conveyor are suitably placed to allow this tilt in the axis of the bottle to occur.

In accordance with the invention, the signal provided by the inspection unit whenever a dirty bottle is sensed is caused to operate means which tilts the axis of the dirty bottle.

For example, the signal may operate a solenoid air valve coupled to a pneumatic cylinder operating a ram which pushes the mouth of the bottle at right angles to its direction of motion.

An even simpler arrangement employs a blast of compressed air from a nozzle instead of the air cylinder. The air blast is of short duration and so timed that only the dirty bottle is tilted.

In another embodiment, a deflector plate set at an angle to the bottle's path may be lowered into position ahead of the dirty bottle so that the normal forward motion of the bottle will cause the mouth to be deflected sideways.

The operation of deflecting the axis of the dirty bottle may take place at the inspection station or, preferably, at a short distance downstream, in which case the reject signal will be stored in a memory, such as a shift register, so that it can be used some time later, i.e. when the dirty bottle has reached the means used for tilting the bottle's axis.

A specially shaped plough is positioned adjacent to and downstream from the point where the mouth of a dirty bottle is deflected.

The first part of the plough engages the neck of the bottle immediately below its mouth and is so shaped that the angle of deflection of the mouth is increased as the bottle continues its forward motion. A lower portion of the plough progressively forces the body of the bottle sideways out of the main stream of bottles into a reject channel reserved for rejected bottles. As a rejected bottle is moved sideways its axis is restored to the vertical position. To this end a fixed rail is provided to engage the mouth of a rejected bottle on the opposite side of the reject channel to the plough and this rail acts as a fulcrum about which the bottle pivots as its axis is returned to the vertical position by the action of the lower portion of the plough and the squeezing action of adjacent bottles.

The point of contact between the bottle and the lower portion of the plough starts high on the shoulder or neck of the bottle and as forward motion of the bottle continues the contact point progressively moves down the body of the bottle until it is completely rejected from the normal flow of bottles.

The plough forms the division between the normal bottle channel and that for the rejected bottles.

In order that the invention may be more clearly understood, reference will now be made to the accompanying drawings.

BRIEF DESCRIPTION OF THE DRAWINGS

FIG. 5 is a series of five diagrams explaining the progressive action of the plough in deflecting a rejected bottle into the reject channel.

DETAILED DESCRIPTION OF THE INVENTION

Figure 1:
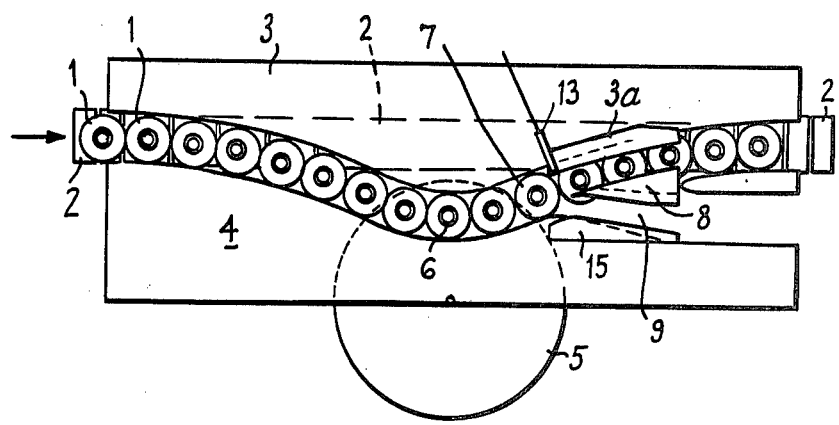
FIG. 1 is a plan view of the bottle feeding apparatus.

As shown in FIG. 1, bottles 1 are presented to the inspection machine on a slat conveyor 2 and pass between the side guides 3 and 4 which define the bottle path in a smooth curve away from the conveyor and onto a rotatable translucent screen 5 of an inspection machine as disclosed in U.S. Pat. No. 3,746,165. Bottle 6 is immediately under the inspection unit (not shown) where an electrical signal is obtained if the bottle is dirty. The signal is stored until the bottle reaches the position represented by bottle 7 where an airblast or other operating means, which may be supported on a neck guide plate 3a, operates on the mouth or neck of the bottle deflects its axis away from vertical so that the neck of the bottle is engaged by the plough 8.

Further movement of the row of bottles causes the rejected bottle to move into the reject channel 9.

Figure 2:
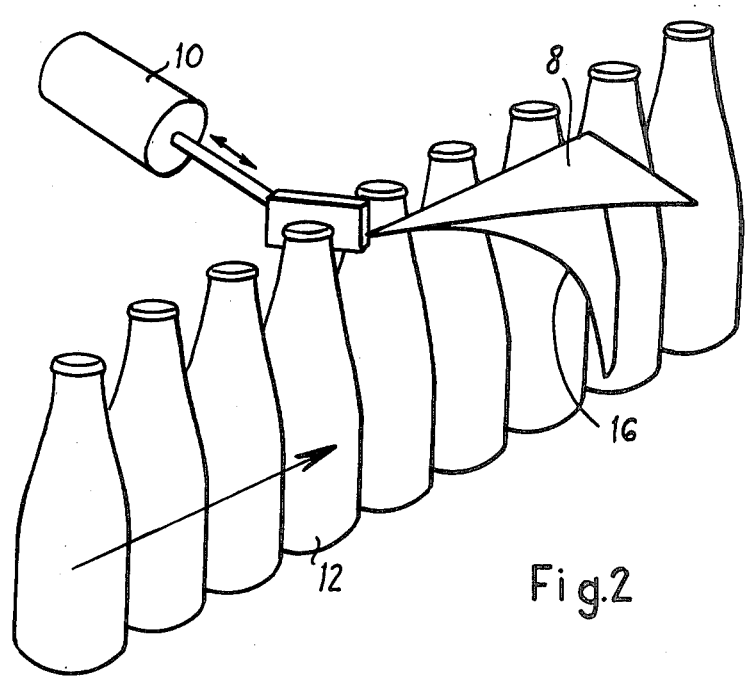
FIGS. 2, 3 and 4 are diagrammatic perspective views of three alternative ways of deflecting the mouth of a bottle to be rejected.
Figure 3:
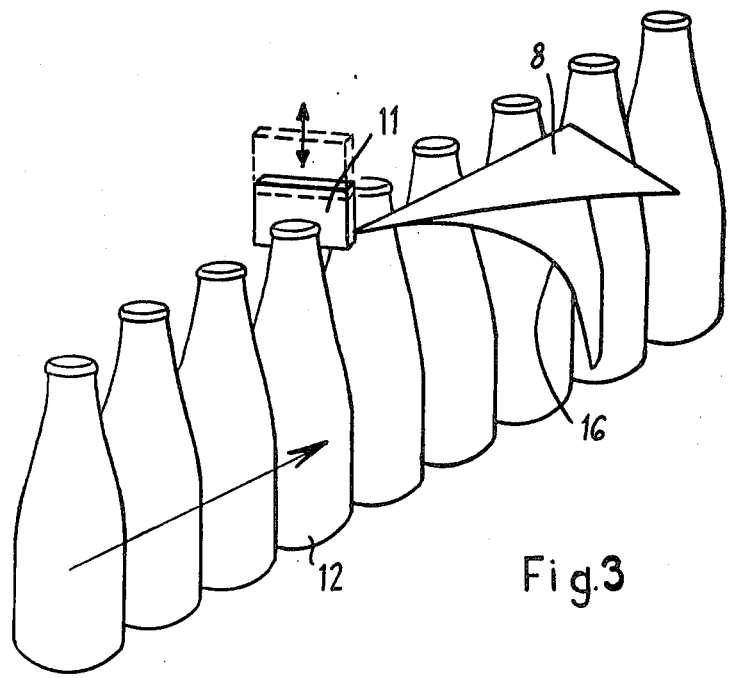
Figure 4:
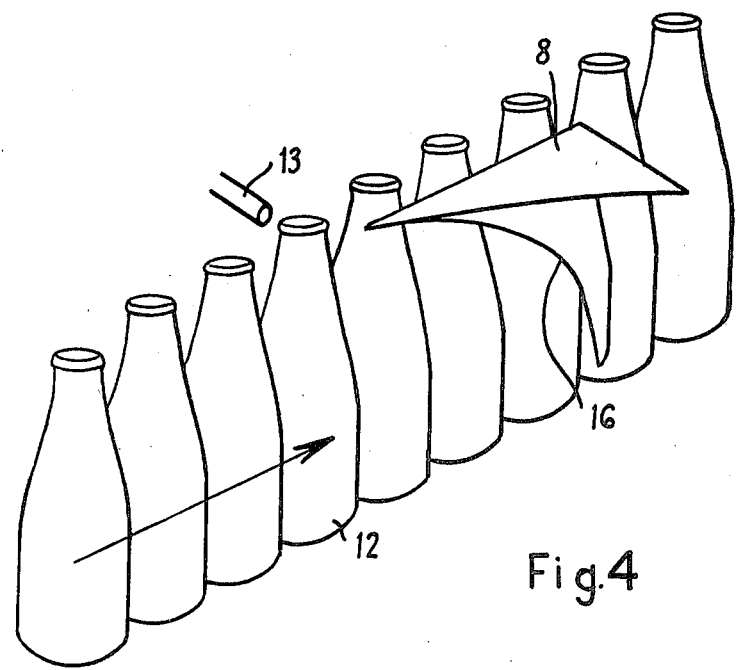

FIGS. 2, 3 and 4 show three alternative methods of deflecting the mouth of the rejected bottle.

In FIG. 2 a pneumatic cylinder 10 is employed to deflect the mouth of the bottle 12 to the other side of the plough 8 so that the bottle will be progressively moved out of the normal bottle flow.

In FIG. 3 a deflector plate 11 is arranged to be moved vertically downwards into the path of the mouth of the bottle 12 to be rejected.

In FIG. 4, which shows the preferred arrangement, a timed blast of compressed air from a nozzle 13 is employed to deflect the mouth of the bottle 12. FIG. 1 also illustrates a nozzle 13.

FIG. 5 shows in the five diagrams 5a to 5e the progressive action of the plough 8 in deflecting the rejected bottle 12 out of the main bottle flow into the reject channel 9.

Figure 6:
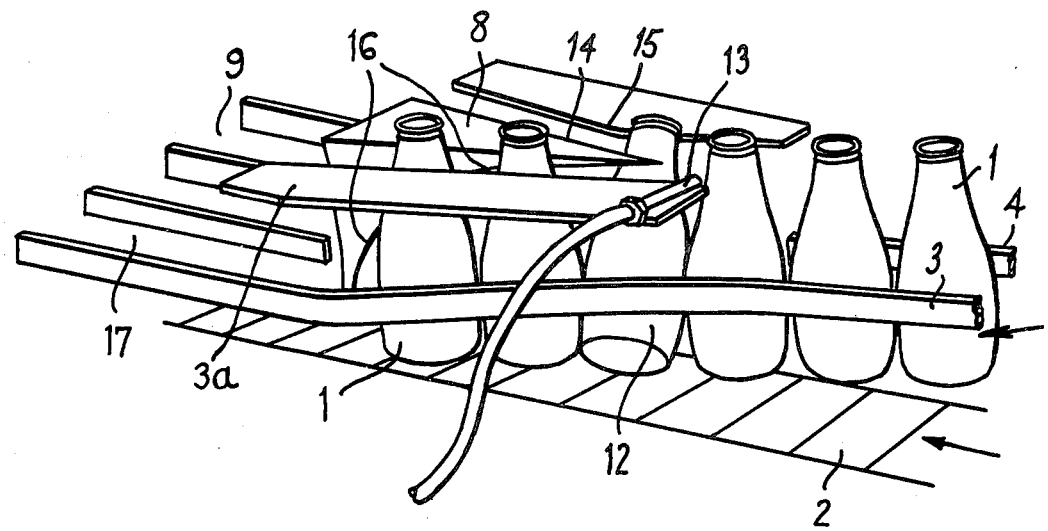
FIG. 6 is a perspective view of the reject mechanism.

FIG. 6 is a perspective view of reject part of the apparatus using an air nozzle 13 which has deflected the mouth of the reject bottle 12 to the edge of the plough and a guide plate 15.

A lower edge 16 of the plough, shaped in a descending curve, engages the body of the bottle. Initially the contact point with the bottle is high on the shoulder but as the rejected bottle is pushed by the following bottles the contact point progressively falls so that the bottle is entirely moved from the normal flow channel 17 into the reject channel 9 and the rejected bottle is restored to its upright position by tilting in the reverse direction about the point of engagement of the bottle neck with the guide plate 15.

Conveniently the reject mechanism is located downstream from the inspection station 6 by a distance of approximately two bottle diameters which requires a three stage shift register. However, the process of deflecting the neck of a bottle with an air jet by a sufficient distance to pass on the reject side of the plough 8 takes a finite length of time after the emergence of a reject signal from the shift register. This delay comprises contributions from the current build up time of the solenoid air valve, some mechanical delay in moving the valve spool, some delay before the compressed air emerges from the nozzle because of the length of the pipe to the valve, and also some delay in accelerating the neck of the bottle to its deflected position because the force of the air jet is finite.

While all these delays may be minimised, they cannot be eliminated and the total is a significant proportion of the time between adjacent bottles when running at high speed, say in excess of 750 bottles per minute. This delay may be compensated for by taking the reject signal out of the second stage of the shift register instead of out of the third and by placing the jet nozzle a suitable distance upstream from the tip of the plough. However, if the machine is now run at very low speed, say 50/min., the wrong bottle will be rejected because the compensation for time delay is not required.

Such low speeds can often arise on starting up a high-speed bottling line while the filler machine is run slowly while the conveyor is run at normal high speed with considerable slip between it and the bases of the bottles. This generates considerably higher bottle-to-bottle pressure, requiring a greater force to deflect the neck than when the bottle speed is high. At these low speeds an air piston and deflector plate, as shown in FIG. 2, is preferable to an air nozzle because at low speed the additional time delay of a cylinder is not significant and it can provide the greater force required at low speed.

Figure 7:
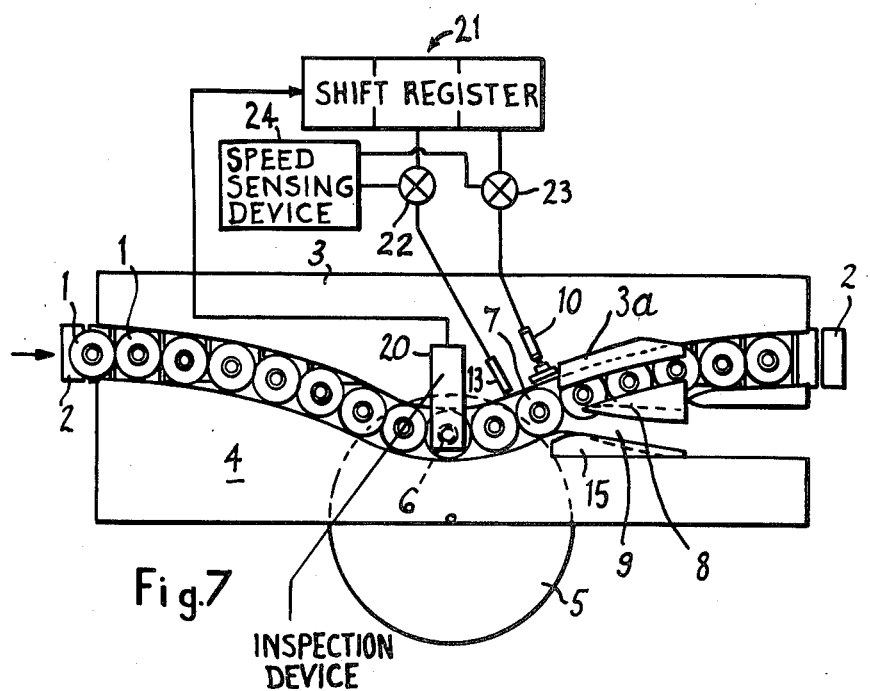
FIG. 7 is a plan view of a modification.

The modified inspection apparatus shown in FIG. 7 enables the correct bottle to be rejected during operation at high speed and also at lower speeds down to zero. This is achieved by providing the apparatus with both an air nozzle reject system and an air cylinder reject system.

FIG. 7 shows diagrammatically a plan view of a bottle feeding apparatus similar to that shown in FIG. 1, the same references being used. The electrical signal produced in the inspection unit 20 upon detection of a dirty bottle is stored in a three-stage shift register 21. The solenoid air valve 22 for the air nozzle 13 is operated from the second stage of the shift register while the solenoid air valve 23 for the air cylinder 10, which is located slightly downstream of the nozzle 13, is operated from the third stage of the shift register.

The ranges of speeds which can be respectively accommodated by the cylinder system operated from the shift register third stage and the nozzle system operated from the second stage are reasonably wide and can be made to overlap substantially.

A speed sensing device 24 is incorporated in the machine and is arranged to switch the reject signal to one or other of the two deflection systems provided and to take this signal from the appropriate stage of the shift register.

A convenient transition speed can be selected, for example 250 bottles per minute, so that for speeds below this value the cylinder system 23, 10 is effective and is operated by a reject signal from the third stage of the register. Above this transition speed the cylinder system 23, 10 is switched off and the air nozzle system 22, 13 switched on but driven by reject signals from the second stage of the shift register 21.

A machine having these two alternative means of deflecting the neck of a bottle for rejection by a plough plate and having a speed sensing device to select which deflecting system is operative will reject the desired bottle at any speed from zero to something in excess of 750 bottles per minute.

While particular embodiments have been described, it will be understood that various modifications may be made without departing from the scope of the invention. For example the reject mechanism can be used with other kinds of inspection apparatus. Further although the invention is particularly applicable to reject mechanism for use in conjunction with bottle inspection apparatus, it is to be understood that the mechanism may be used in conjunction with bottle feeding or handling apparatus generally, such as where a stream of bottles has to be divided into two or more channels for some purpose other than rejection of a bottle.

We claim:

1. Bottle feeding apparatus comprising guide means defining a path along which bottles are adapted to be moved in an upright position in a single file, means for moving a stream of bottles along said path, means for deflecting the mouth of a bottle transversely to its direction of forward motion along said path to tilt the axis of the bottle, and a plough positioned adjacent to and downstream of where the deflecting means tilts a bottle, said plough being arranged to engage the neck of a deflected bottle and being shaped to displace the body of a deflected bottle sideways out of the stream of bottles moving in said path.

2. Apparatus as claimed in claim 1, including a deflection channel into which deflected bottles which are moved sideways out of the stream of bottles are guided by the plough, said deflection channel including a rail at the side thereof remote from said path and arranged to engage the neck of a tilted bottle to act as a fulcrum about which the bottle pivots to restore its axis to an upright position as the body of the bottle is forced sideways by the plough.

3. Apparatus as claimed in claim 1, wherein the deflecting means comprises an air nozzle and a valve controlling a supply of compressed air to said nozzle, said nozzle being positioned to direct an airblast on to the necks of bottles moving along said path.

4. Apparatus as claimed in claim 1, wherein the deflecting means comprises an air cylinder and a valve controlling a supply of differential air pressure to said cylinder, said cylinder actuating a deflector member arranged to move into and out of engagement with the necks of bottles moving along said path.

5. Apparatus as claimed in claim 1, wherein said path guides the bottles to move past an inspection device, said inspection device including detector means which produces a reject signal upon detection of a bottle to be rejected, a memory for storing said signal, means for retrieving said reject signal from the memory, and means responsive to said retrieved reject signal to actuate the deflecting means.

6. Apparatus as claimed in claim 5, wherein the memory comprises a plurality of stages, a first deflecting means comprising an air nozzle and a valve controlling a supply of compressed air to said nozzle, a second deflecting means comprising an air cylinder and associated mechanical deflector and a valve controlling the supply of differential air pressure to said air cylinder, said second deflecting means being arranged downstream of first deflecting means, first means for retrieving said reject signal from a stage of said memory, second means for retrieving said reject signal from a later stage of said memory, means for operating the valve of said first deflecting means in response to said reject signal retrieved by said first retrieving means, means for operating the valve of said second deflecting means in response to said reject signal retrieved by said second retrieving means, means for sensing the speed at which bottles are being fed along said path, and means responsive to said speed sensing means for selectively rendering said first or second deflecting means responsive to a retrieved reject signal.

* * * * *